US010320829B1

(12) United States Patent
Banga et al.

(10) Patent No.: US 10,320,829 B1
(45) Date of Patent: Jun. 11, 2019

(54) COMPREHENSIVE MODELING AND MITIGATION OF SECURITY RISK VULNERABILITIES IN AN ENTERPRISE NETWORK

(71) Applicant: Balbix, Inc., San Jose, CA (US)

(72) Inventors: Gaurav Banga, Cupertino, CA (US); Rajarshi Gupta, Sunnyvale, CA (US); Vinay Sridhara, Santa Clara, CA (US); Vineet Kumar, San Jose, CA (US)

(73) Assignee: Balbix, Inc., San Jose, CA (US)

( * ) Notice: Subject to any disclaimer, the term of this patent is extended or adjusted under 35 U.S.C. 154(b) by 231 days.

(21) Appl. No.: 15/234,970

(22) Filed: Aug. 11, 2016

(51) Int. Cl.
*H04L 29/06* (2006.01)
(52) U.S. Cl.
CPC ................ *H04L 63/1433* (2013.01)
(58) Field of Classification Search
CPC ............. H04L 63/1433; H04L 63/1425; H04L 63/1441; H04L 63/1416; H04L 63/20; H04L 63/1408; H04L 43/062; H04L 63/062
USPC .......................................................... 726/25
See application file for complete search history.

(56) References Cited

U.S. PATENT DOCUMENTS

| | | | | |
|---|---|---|---|---|
| 8,046,835 B2 * | 10/2011 | Herz | .................... | G06Q 20/201 726/25 |
| 9,294,498 B1 * | 3/2016 | Yampolskiy | ........ | H04L 63/1433 |
| 9,697,019 B1 * | 7/2017 | Fitzgerald | ........... | G06F 9/45537 |
| 9,800,603 B1 * | 10/2017 | Sidagni | ............... | H04L 63/1433 |
| 2006/0021049 A1 * | 1/2006 | Cook | .................... | G06F 21/577 726/25 |
| 2006/0095961 A1 * | 5/2006 | Govindarajan | ..... | H04L 63/1416 726/15 |
| 2007/0106754 A1 * | 5/2007 | Moore | .................. | G06F 21/604 709/217 |
| 2007/0143827 A1 * | 6/2007 | Nicodemus | ......... | G06F 21/6218 726/2 |
| 2007/0143851 A1 * | 6/2007 | Nicodemus | ......... | G06F 11/3495 726/25 |
| 2008/0040151 A1 * | 2/2008 | Moore | .................. | G06F 19/324 705/2 |
| 2009/0019443 A1 * | 1/2009 | Jakob | .................. | G06F 11/2094 718/102 |
| 2009/0024663 A1 * | 1/2009 | McGovern | ............ | G06F 21/577 |
| 2009/0254572 A1 * | 10/2009 | Redlich | .................. | G06Q 10/06 |

(Continued)

*Primary Examiner* — Kambiz Zand
*Assistant Examiner* — Mahabub S Ahmed
(74) *Attorney, Agent, or Firm* — Brokaw Patent Law PC; Christopher J. Brokaw

(57) ABSTRACT

Approaches for analyzing risk of security breaches to a network. Agents gather, from multiple sources across the network, analysis data that identifies one or more habitable nodes and one or more opaque nodes. Habitable nodes each possess a computing environment conducive to installation of at least one of agent, while opaque nodes do not. An enterprise risk model is generated for the network using the analysis data. The enterprise risk model models a risk of security breaches to assets of the network from both authorized and unauthorized users of the network based on attributes of the habitable nodes and the opaque nodes of the network. The enterprise risk model may model both the present and the future risk to the enterprise, enabling, resources, such as time and money, to be best allocated in a scientific and methodical manner to improve the risk profile of the enterprise network.

23 Claims, 13 Drawing Sheets

(56) References Cited

U.S. PATENT DOCUMENTS

| | | | | |
|---|---|---|---|---|
| 2009/0300610 A1* | 12/2009 | Hicks | G06F 8/61 | 718/1 |
| 2011/0126111 A1* | 5/2011 | Gill | G06F 21/55 | 715/736 |
| 2011/0209194 A1* | 8/2011 | Kennedy | G06F 21/55 | 726/1 |
| 2012/0216243 A1* | 8/2012 | Gill | G06F 21/55 | 726/1 |
| 2012/0246647 A1* | 9/2012 | Ciano | G06F 9/45533 | 718/1 |
| 2013/0031037 A1* | 1/2013 | Brandt | H04L 63/1408 | 706/12 |
| 2013/0086636 A1* | 4/2013 | Golovanov | G06F 21/56 | 726/3 |
| 2013/0091573 A1* | 4/2013 | Herz | H04L 63/1441 | 726/23 |
| 2014/0165207 A1* | 6/2014 | Engel | H04L 63/1425 | 726/25 |
| 2014/0215621 A1* | 7/2014 | Xaypanya | H04L 63/145 | 726/23 |
| 2014/0237599 A1* | 8/2014 | Gertner | H04L 63/145 | 726/24 |
| 2014/0337429 A1* | 11/2014 | Asenjo | H04L 65/403 | 709/204 |
| 2014/0380488 A1* | 12/2014 | Datta Ray | H04L 63/1433 | 726/25 |
| 2015/0039757 A1* | 2/2015 | Petersen | H04L 63/0227 | 709/224 |
| 2015/0095102 A1* | 4/2015 | Hanley | G06Q 10/0635 | 705/7.28 |
| 2015/0172311 A1* | 6/2015 | Freedman | H04L 63/1433 | 726/1 |
| 2015/0244732 A1* | 8/2015 | Golshan | G06F 21/561 | 726/24 |
| 2015/0373043 A1* | 12/2015 | Wang | G06F 21/552 | 706/12 |
| 2016/0029221 A1* | 1/2016 | Suarez Garcia | G06F 21/561 | 455/410 |
| 2016/0042179 A1* | 2/2016 | Weingarten | G06F 21/566 | 726/23 |
| 2016/0050222 A1* | 2/2016 | Iyer | H04L 63/1416 | 726/1 |
| 2017/0034193 A1* | 2/2017 | Schulman | H04L 63/1416 | |
| 2017/0063920 A1* | 3/2017 | Thomas | H04L 9/32 | |
| 2017/0093910 A1* | 3/2017 | Gukal | H04L 63/1416 | |
| 2017/0134415 A1* | 5/2017 | Muddu | G06F 16/254 | |
| 2017/0187600 A1* | 6/2017 | Shazly | H04L 41/5009 | |
| 2017/0222815 A1* | 8/2017 | Meriac | G06F 21/554 | |
| 2017/0230412 A1* | 8/2017 | Thomas | H04L 9/32 | |
| 2017/0264639 A1* | 9/2017 | Sama | H04L 63/029 | |
| 2017/0289184 A1* | 10/2017 | C | H04L 63/1425 | |
| 2017/0359366 A1* | 12/2017 | Bushey | H04W 4/38 | |
| 2018/0159891 A1* | 6/2018 | Sultan | H04L 63/1433 | |

\* cited by examiner

US 10,320,829 B1

COMPREHENSIVE MODELING AND MITIGATION OF SECURITY RISK VULNERABILITIES IN AN ENTERPRISE NETWORK

FIELD OF THE INVENTION

Embodiments of the invention generally relate to modeling digital security and preventing malicious attacks to digital resources.

BACKGROUND

Despite the extraordinary effort expended to prevent security breaches, the frequency and severity of security breaches continue to increase over time. Digital security has proven to be a more complicated and extensive problem than what had been previously envisioned.

Most modern approaches for combating malware rely upon recognition and containment. The general premise behind most anti-virus software is the assumption that digital signatures of previously identified malware may be used to identify malware encountered in the future. This strategy is not successful when the malware has not been previously encountered or has mutated over time to possess a different digital signature. Other firewalls and anti-virus software both operate under the presumption that malware may be identified by tell-tale features or behavioral idiosyncrasies. However, in practice, customized malware designed to breach the specific defenses of a particular enterprise network may be crafted in hours or days. Consequently, the malware encountered by any organization of substantial magnitude is often unique to that organization. Approaches which rely upon recognizing previously encountered malware traits and patterns are thus hobbled out of the gate.

Consequently, approaches for improving the privacy and security of a computer network are not only welcome, but vital to the health of our increasing computerized society.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
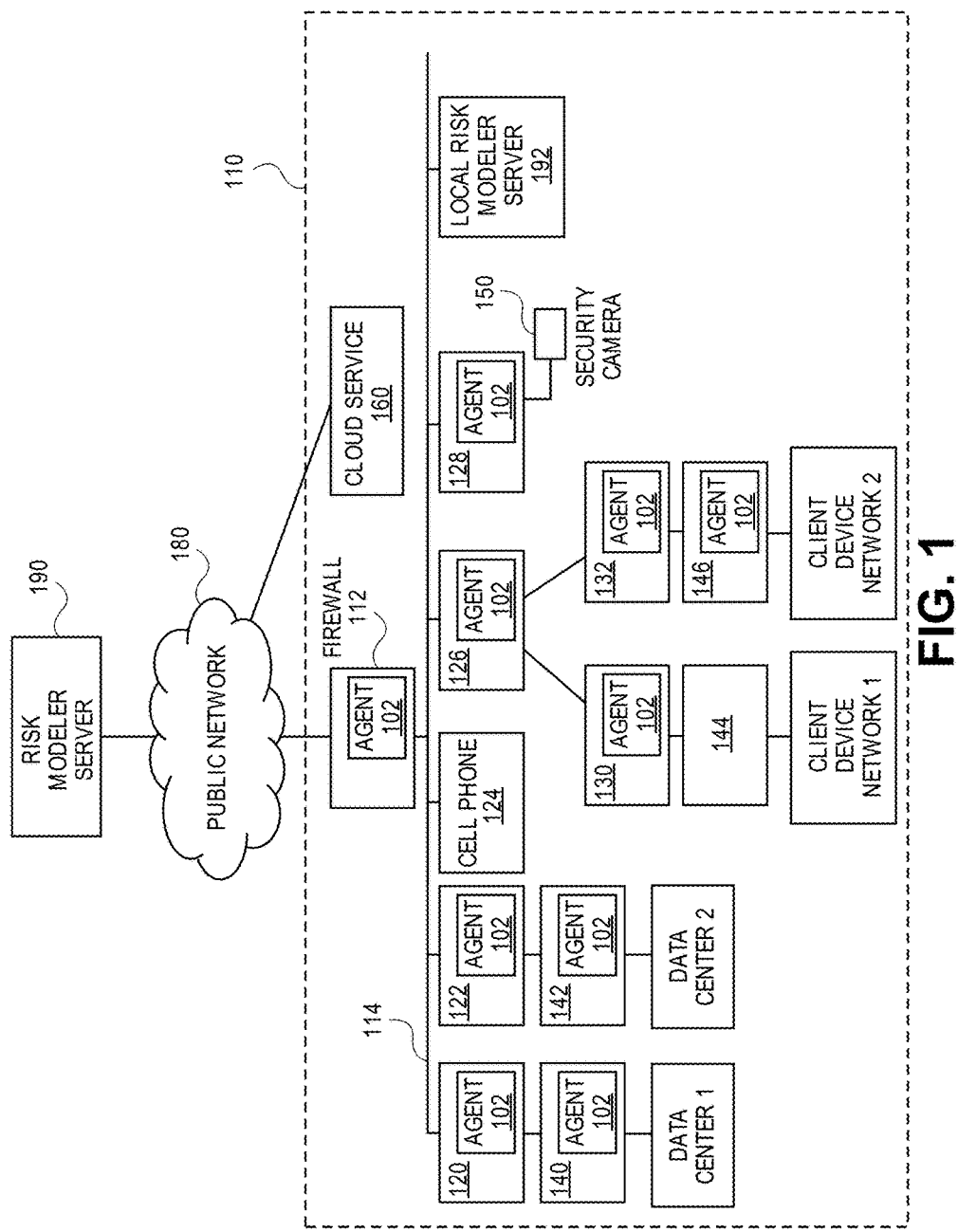
FIG. 1 is a block diagram of a system according to an embodiment of the invention.

Approaches for programmatic mechanisms for analyzing and modeling the security of a network are presented herein. The approaches discussed herein may be used to precisely and quantitatively identify risk exposure for digital assets and evaluate how that risk exposure can be mitigated through specific courses of action. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Virtually all modern enterprises employ an internal network to which is connected a large number of devices. In addition to the networked computers and digital assets of the enterprise, each employee often uses multiple computerized devices in the course of their duties and daily life, such as a personal computer, laptop computer, cell phone, and the like. Each device coupled to the enterprise network is a potential attack vector against the enterprise.

The term "Internet of Things" has been widely adopted to refer to the widely followed trend of connecting a variety of electronic devices to a computer network. Enterprises shoulder an ever-increasing risk from attack from such unlikely sources, such as a networked flat screen television used in a conference room or a web-enabled security camera which can connect to the Internet and the enterprise's intranet.

Embodiments of the invention operate under the observation that customized malware and computerized attacks against the digital resources of an enterprise are designed to target the perceived weakest link in the exposed perimeter of the enterprise network. By way of analogy, embodiments presume that attacks will attempt to breach a wall by building a ladder to clamber over the lowest point in the wall, and so, continuing with this analogy, resources and attention are better spent shoring up the lowest point in the wall rather than other locations in the wall which are reasonably impregnable in view of the assets being protected behind the wall.

Embodiments of the invention may be used to programmatically identify, via a systematic and methodical process, all devices, or nodes, which are connected to a computer network. Further, embodiments enable an administrator of an enterprise network to generate a complete list of assets on the network and the location at which those assets are stored. As used herein, an asset on the network refers to units of digital information. Digital assets of a company include their trade secrets, work product, images, files, and any digital content belonging to the company.

Embodiments of the invention can also ensure that all devices connected to the computer network are used appropriately, i.e., in a manner of which the enterprise or owner approves. In other words, embodiments can be used to ensure that all devices connected to a computer network are used by appropriate personal and in an approved manner.

Further, embodiments may analyze each device connected to an enterprise network to determine the risk to the enterprise presented by that device. Approaches for presenting information, in a variety of different ways, that describes the risk to the privacy and integrity of the enterprise network based on the computerized enterprises' assets will be discussed. For example, embodiments may depict a risk heat map which graphically depicts the risk to the enterprise's assets posed by of all the enterprise's network-connected devices. The risk heat map may be overlaid with the enterprises' organizational chart, network diagram, and other illustrations which may intuitively impart information to the viewer.

To determine the risk to the enterprise presented by each network-connected asset, embodiments may develop and maintain an enterprise risk model that models the risk to the security and integrity of the enterprise presented by each asset. The enterprise risk model may model both the present and the future risk to the enterprise; thus, unlike certain prior approaches, the enterprise risk model is instructive on what may happen in the future. By using the enterprise risk model to gather intelligence about present and future risks of security breaches, resources, such as time and money, may be best allocated in a targeted and methodical manner to improve the risk profile of the enterprise network until an acceptable level of risk is achieved.

The features discussed above are intended to provide a high level overview of certain capabilities of several embodiments, but not a complete enumeration of all the features of all embodiments discussed herein.

System Overview

FIG. 1 is a block diagram of a system according to an embodiment of the invention. FIG. 1 depicts an enterprise network 110, a public network 180, and risk modeler servers 190 and 192 of an embodiment. Enterprise network 110, as broadly used herein, represents any computer network belong to or used by any entity, such as but not limited to a company, an enterprise, an organization, a government, or any other entity. Enterprise network 110 represents any type of computer network and is not limited to, or dependent upon in any respect, any particular type of operator of the network.

For clarity, enterprise network 110 is depicted in FIG. 1 as comprising a handful of devices; however, in practice, enterprise network 110 may comprise many hundreds of thousands of devices or more. Moreover, the arrangement of devices in enterprise network 110 shown in FIG. 1 is merely a simplified example, as embodiments of the invention do not require any particular logical arrangement of devices in enterprise network 110. Thus, it should be understood that enterprise network 110 may constitute any arrangement of devices configured in any conceivable manner.

A wide variety of different devices may be connected to enterprise network 110, including electronic devices not classically thought of as a computer. For this reason, as broadly used herein, any electronic device capable of communicating with enterprise network 110 shall be referred to herein as a node. Thus, non-limiting examples of nodes of enterprise network 110 include those typically associated with the term computer, such as a personal computer (PC), a laptop computer, a server, a router, a printer, a desk phone, a tablet device, a personal digital assistance (PDA), a firewall server 112, a mainframe, and the like. Other non-limiting examples of nodes of enterprise network 110 include those not typically associated with the term computer, such as a cell phone 124, a television, a digital security camera 150, wearable technology, security systems, web-enabled appliances, a digital video recorder (DVR), a game console, and the like.

As used herein, the term 'perimeter' refers to those nodes of enterprise network 110 which directly communicate with public network 180. For example, a node of enterprise network 110 which allows the user to use a web browser or access their web-based personal email account shall be said to reside on the perimeter of enterprise network 110, regardless of where that node physically exists or disposed within the logical or physical structure of enterprise network 110.

If a node is not on the perimeter of enterprise network 110, then the node is said to reside in the core of enterprise network 110. Thus, if a node is in the core of enterprise network 110, that node does not directly communicate with public network 180; however, a node in the core of enterprise network 110 can communicate with other nodes of enterprise network 110 over Intranet 114. It is strategically advantageous for important assets to reside in the core, rather than the perimeter, given that the core is insulated from security breaches to a certain extent by the perimeter.

Figure 2:
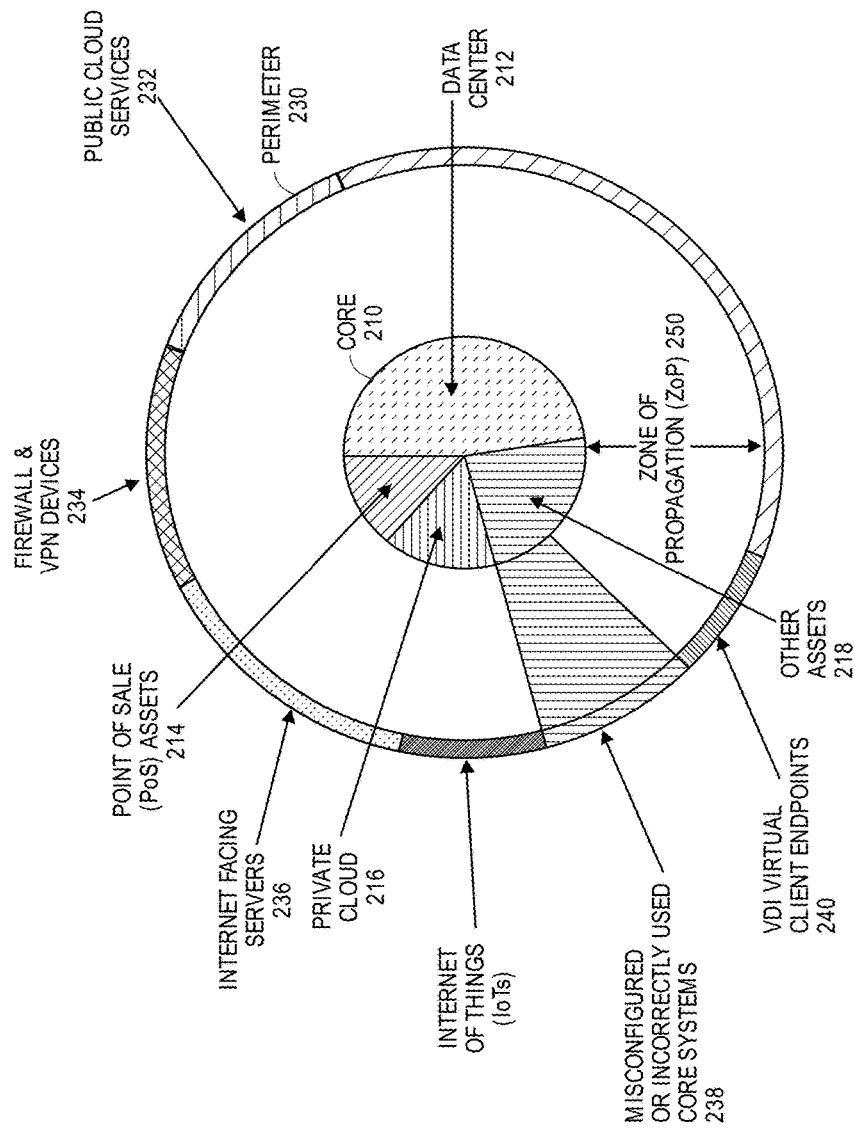
FIG. 2, which is a diagram illustrating the core and perimeter of an enterprise network according to an embodiment of the invention.

To illustrate characteristics of the core and perimeter, consider FIG. 2, which is a diagram illustrating the core 210 and perimeter 230 of an exemplary enterprise network according to an embodiment of the invention. As shown in the example of FIG. 2, core 210 comprises nodes of a data center 212, Point of Sale (PoS) nodes 214, private cloud 216, and other assets 218, while perimeter 230 comprises public cloud services 232, firewall and virtual private network devices 234, Internet facing servers 236, misconfigured or incorrectly used core systems 238, and virtual desktop interface (VDI) client endpoints 240. Those skilled in the art shall appreciate that FIG. 2 depicts one example of an arrangement of nodes split between a perimeter and a core and that any number of arrangements may be used in practice.

Note that enterprises may not always know with precision which nodes of enterprise network 110 reside in perimeter 230 and which reside in core 210. Thus, a misconfigured or incorrectly used core system 238 could expose certain assets, such as assets 218, to perimeter 230, thereby rendering those assets vulnerable to a security breach. A zone of propagation (ZoP) 250 exists between perimeter 230 and core 210. In certain prior approaches, zone of propagation 250 offered no or very minor resistance or barriers to intruders once perimeter 230 was breached. Thus, once one node in core 210 is breached by a malicious attacker, then that attacker can use that compromised node to launch other attacks against targets in core 210, thereby further jeopardizing the assets of core 210.

Figure 3:
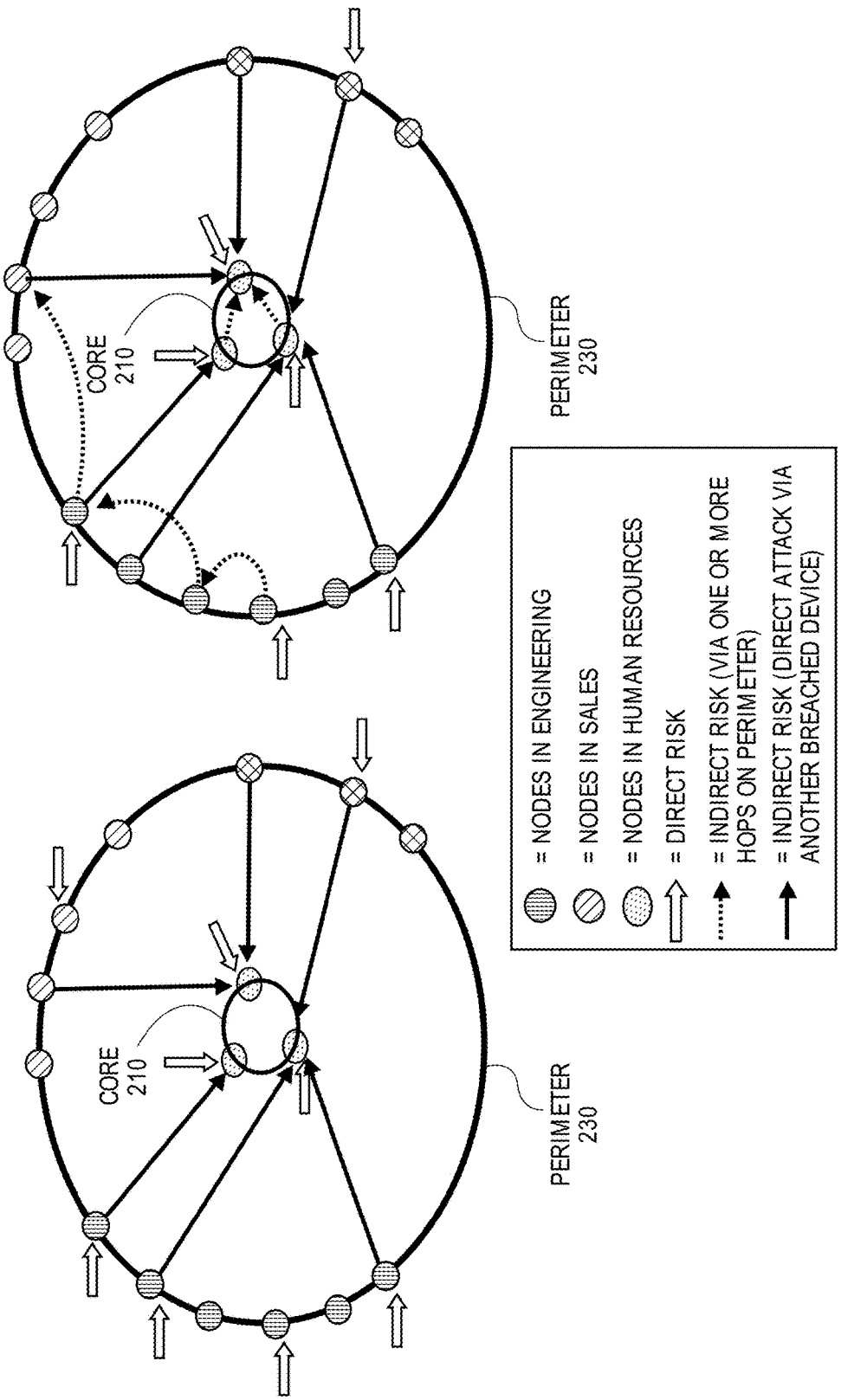
FIG. 3 is a diagram illustrating attack paths into the core and an enterprise network according to an embodiment of the invention.

FIG. 3 is a diagram illustrating attack paths into the core and an enterprise network according to an embodiment of the invention. As shown in FIG. 3, a malicious attacker may directly attack on nodes on perimeter 230. After compromising a node on perimeter, the attacker may then either directly or indirectly attack nodes located in core 210.

Certain nodes on the perimeter of enterprise network 110 may include related assets and services capable of affecting the privacy and integrity of enterprise network 110 while nevertheless being out of the direct control of the operator of enterprise network 110. For example, cloud-services, such as cloud-service 160, used by the enterprise also reside on the perimeter of enterprise network 110. As another example, the personal mobile devices (such as a personal, non-work related cell phone 124) used by employees or authorized users of enterprise network 110, which may contain work related information (such as but not limited to passwords and digital credentials) as well as personal information, are also on the perimeter of enterprise network 110.

FIG. 1 depicts an example arrangement of nodes of enterprise network 110. As depicted in FIG. 1, nodes 120, 122, 124, 126, 128, 130, 132, 140, 142, 144, 146, 150, and 160 are arranged in a logical structure and communicate over Intranet 114. Data center 1 and 2 as well as client device network 1 and 2 depicted in FIG. 1 may each comprise any number of nodes in any arrangement.

Public network 180 is intended to represent any type of publically accessible network, such as but not limited to the Internet.

Risk modeler server 190, as broadly used herein, refers to one or more servers accessible by enterprise network 110 over public network 180. Thus, while FIG. 1 depicts risk modeler server 190 as a single entity, in practice risk modeler server 190 may be implemented on two or more servers for scalability and fault-tolerant purposes. The role played by risk modeler server 190 in various embodiments shall be explained below; however, in brief, risk modeler server 190 may install one or more agents onto nodes of enterprise network 110. These agents will disperse over the nodes of enterprise network 110 and will provide, to risk modeler server 190, information (termed "analysis data") used by risk modeler server 190 to build an enterprise risk model, such as enterprise risk model 500 depicted in FIG. 5. Risk modeler server 190 may thereafter receive information from one or more sources, such as for example the agents installed on enterprise network, learned professionals, and information about current events, to refine and perfect enterprise risk model 500 over time.

Local risk modeler server 192, as broadly used herein, refers to one or more servers accessible by enterprise network 110 over Intranet 114. Thus, while FIG. 1 depicts local risk modeler server 192 as a single entity, in practice local risk modeler server 192 may be implemented on two or more servers for scalability and fault-tolerant purposes.

Local risk modeler server 192 may perform certain responsibilities instead of, or in tandem with, risk modeler server 190. Certain embodiments may only include one of risk modeler server 190 and local risk modeler server 192; thus, if either risk modeler server 190 and local risk modeler server 192 is present the other may, but need not, also be present.

Embodiments may employ local risk modeler server 192 without employing risk modeler server 190 in situations where privacy is of paramount concern, as no data will be transmitted over public network 180. Risk modeler server 190 may be used with a single enterprise network or a plurality of enterprise networks; thus, in certain embodiments, risk modeler server 190 may have the benefit of refining the enterprise risk model using a plethora of information collected from a plurality of enterprise networks.

In an embodiment, local risk modeler server 192 may be hosted in public network 180 as a shared server connected securely to enterprise network 110. This secure connection might be via a point-to-point VPN tunnel or other secure connections such as but not limited to a Transport Layer Security (TLS) connection.

Modeling Different Attack Vectors

Embodiments of the invention may be used to scientifically assess the risk posed to digital assets from a variety of attack vectors. In an embodiment, the one or more agents 102 executing on certain nodes of enterprise network 110 may collect certain data ("analysis data") about nodes of enterprise network. The analysis data collected by the one or more agents may then be transmitted to risk modeler server 190 or local risk modeler server 192 for subsequent analysis. The analysis data may identify, for a particular node, be it a habitable node or an opaque node, certain relative vulnerabilities of that node.

Figure 4:
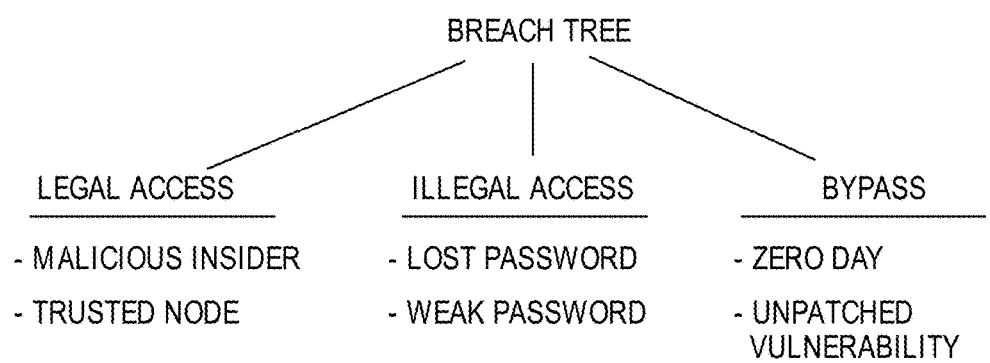
FIG. 4 is an illustration of different categories of attack vectors according to embodiments of the invention.

FIG. 4 is an illustration of several exemplary categories of attack vectors addressed by embodiments of the invention. The relatively likelihood of a particular node experiencing and/or succumbing to the categories of attack vectors shown in FIG. 4 may be analyzed by an enterprise risk model and the analysis data received from the one or more agents 102.

In an embodiment, the analysis data, sent from a particular agent 102 to either risk modeler server 190 or local risk modeler server 192, may comprise data describing a node's vulnerabilities or exposure to certain attack vectors, such legal access, illegal access, and bypass access. The legal access attack vector corresponds to a security breach perpetrated by a trusted user or trusted entity. Non-limiting examples of a legal access attack vector include activity by a malicious user who has legitimate access to the node (in other words, a "malicious insider") or activity initiated at another node which is trusted (but may be compromised by malicious software).

The illegal access attack vector corresponds to a security breach perpetrated vis-à-vis the malicious acquisition of credentials. For example, the analysis data collected by an agent 102 may comprise password information that describes how passwords are used on a particular node. This password information may identify any weak passwords employed by the particular node, any shared passwords used by the particular node and another entity other than said particular node, and whether the particular node does not require a password to access certain assets or services. In this way, the enterprise risk model may assess the vulnerabilities of credentials used by nodes of enterprise network 110 for purposes of quantifying the risk posed thereby and providing a relative measure of how that risk differs from node to node and from an acceptable baseline level.

The bypass attack vector corresponds to a security breach perpetrated by a software vulnerability used to bypass the access control system. For example, a bypass attack vector may be a software bug or glitch that allows the attacker to bypass the access control system. Non-limiting, illustrative examples of a bypass attack vector include zero day attacks, unpatched software vulnerabilities, and man-in-the-middle attacks. Certain software installed on a node may be more vulnerable to zero day attacks or may require more frequent software patches. These vulnerabilities may be assessed by agents 102 and those determinations may be communicated to risk modeler server 190 or local risk modeler server 192 for further study and review.

Generating the Multi-Layer Model

Figure 5:
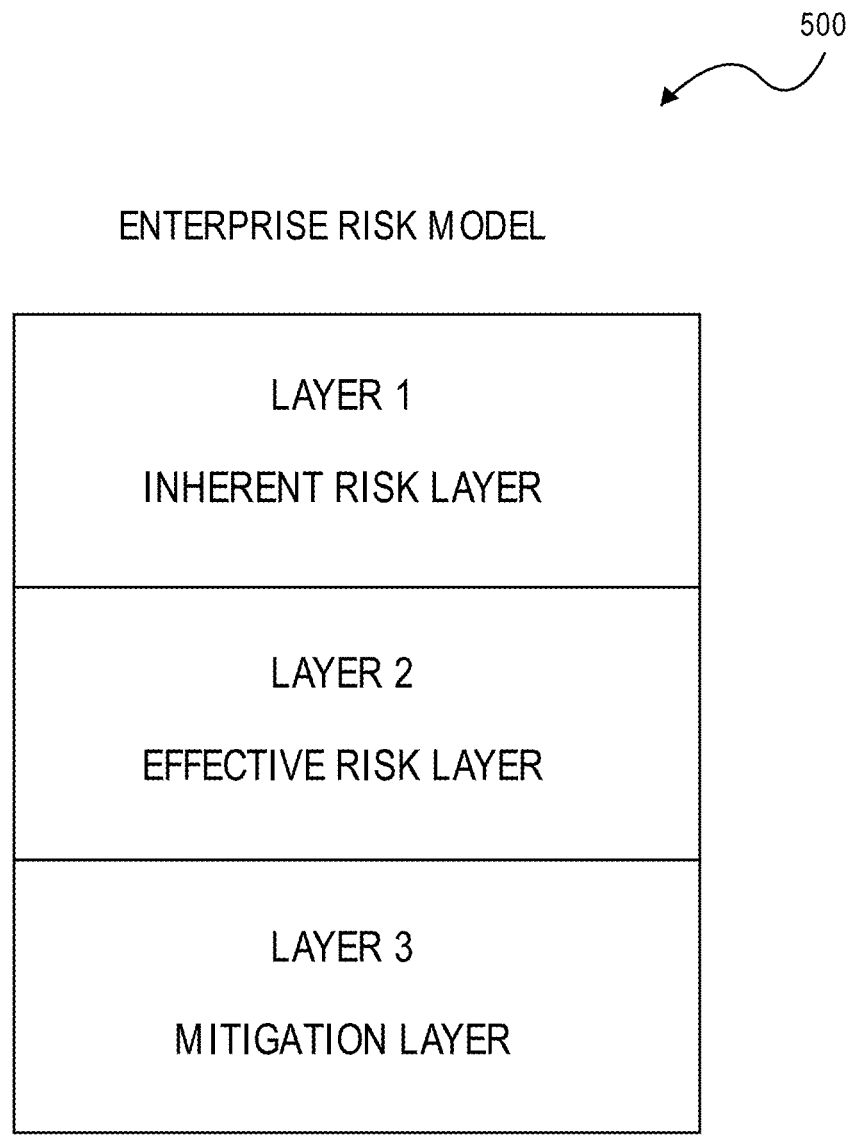
FIG. 5 is an illustration of an enterprise risk model according to an embodiment of the invention.

The enterprise risk model of an embodiment may comprise a variety of different layers so that a variety of different nuances and complexities may be modeled and considered. FIG. 5 is an illustration of an enterprise risk model 500 according to one embodiment of the invention. As shown in FIG. 5, enterprise risk model 500 may comprise a layer (termed an "inherent risk layer" or layer 1) that models an inherent risk presented to the enterprise network based on static features of the enterprise network. The inherent risk layer may also model the risk presented to the enterprise from both authorized and unauthorized users of the network.

An enterprise risk model of an embodiment may also comprise a layer (termed a "effective risk layer" or layer 2) that models a present state of risk to the enterprise network caused by dynamic conditions, such as global, temporal events, and specific attack methods and tactics which may be in active use by attackers at any given moment of time. The enterprise risk model of an embodiment may also comprise a layer (termed a "mitigation layer" or layer 3) that models a reduction in risk to the enterprise network in response to the performance of potential mitigative actions, implemented mitigative actions, and mitigative actions in the process of being implemented.

Enterprise risk model 500 is generated by scientifically observing all nodes and assets of enterprise network 110. Using enterprise risk model 500, embodiments are able to predict, analytically and scientifically, the nodes of enterprise network 110 which are likely presently compromised and the likelihood of each node of enterprise network 110 becoming compromised in the future. In addition to identifying the relative likelihood of each node of enterprise network 110 becoming compromised in the future, enterprise risk model 500 may be used by embodiments to predict the likelihood of how those nodes will likely be breached or compromised by malicious code in the future.

Figure 6:
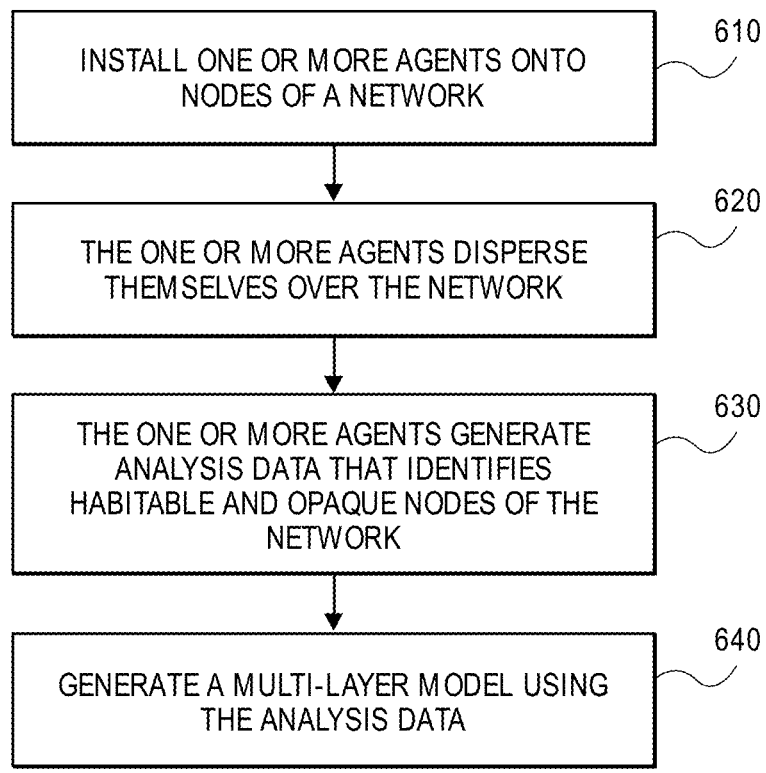
FIG. 6 is a flowchart illustrating the steps of analyzing the security of a network according to an embodiment of the invention.

FIG. 6 is a flowchart illustrating the steps of analyzing the security of a network according to an embodiment of the invention. Note that the sequence of steps illustrated in FIG. 6 may be performed in a difference sequence than that depicted. For example, certain steps of FIG. 6 may be performed in parallel with one another or certain steps may be repeatedly performed. Thus, the logical progression of steps depicted in FIG. 6 is merely for explanation purposes and practical embodiments may employ any of the steps of FIG. 6 when appropriate.

In step 610, one or more agents 102 are installed onto nodes of enterprise network 110. Either risk modeler server 190 or local risk modeler server 192 may be the source of the dissemination of agents 102 onto one or more nodes of enterprise network 110 in step 610. Alternatively, agents 102 may be installed and managed by any other software provisioning server. As step 610 is performed with the blessing of the operator of enterprise network 110, the operator of enterprise network 110 may permit risk modeler server 190 to access enterprise network 110 by providing sufficient access credentials to the risk modeler server 190. Alternately, the operator of risk modeler server 190 may provide software to the operator of enterprise network 110 so that the operator of enterprise network 110 may themselves install one or more agents 102 onto nodes of enterprise network 110. For example, local risk model server 192 may be established on Intranet 114 to facilitate the dissemination of one or more agents 102 over Intranet 114 in step 610.

One or more agents 102, as broadly used herein, are software agents that are configured to, among other tasks, monitor nodes of enterprise network 110 for purposes of collecting information used in constructing and refining enterprise risk model 500. The functions performed by one or more agents 102 according to certain embodiments of the invention shall be described in more detail below.

There are two types of nodes, namely habitable nodes and opaque nodes. A habitable node is a node of enterprise network 110 that possesses a computing environment conducive to installation of an agent 102. On the other hand, an opaque node is a node of enterprise network 110 that possesses a computing environment not conducive to installation of an agent 102. For example, a personal computer is an example of a habitable node, because an agent 102 may be installed upon a personal computer without difficulty. An example of an opaque node is an iPhone, as software cannot be installed on an iPhone without the consent and cooperation of Apple Corporation. Another potential example of an opaque node is a web-enabled security camera which, while being capable of sending and receiving data over enterprise network 110, lacks a sophisticated enough computing environment to facilitate the installation of agent 102.

Certain opaque nodes may expose an application program interface (API) to enable requestors to retrieve information from the node. For example, a network router often supports a Simple Network Management Protocol (SNMP) interface that enables a requestor to query information from the device. An agent 102 of an embodiment may use this SNMP interface to collect information from the network router, even if the agent 102 is not installed on that network router. As another example, an Active Directory Server will often comprise a Lightweight Directory Access Protocol (LDAP) interface that enables a requestor to query information from the Active Directory Server. An agent 102 of an embodiment may use this LDAP interface to collect information from the Active Directory Server, even if the agent 102 is not installed on the Active Directory Server.

Note that certain embodiments may employ a plurality of different types of agents 102. In such an embodiment, there may exist a particular type of agent 102 designed to execute on a particular computing environment which supports only a minimal set of software, such as a web-enabled security camera. In such an embodiment then, the web-enabled security camera may be considered a habitable node for an agent that supports installation thereon.

An agent 102 may be installed in network proximity (e.g., same subnet and/or same VLAN) as an opaque node. Even though an agent 102 cannot be installed upon an opaque node, an agent 102 may observe and measure network activity going to and from an opaque node; in this manner, agent 102 can generate observation data on opaque nodes. If available, an agent may also obtain using an API exposed by an opaque node to collect information about the opaque node. After one or more agents 102 have been installed on at least one habitable node of enterprise network 110, step 620 may be performed.

In step 620, one or more agents 102 disperse themselves over enterprise network 110. Each agent 102, upon being installed upon a particular habitable node of enterprise network 110, analyzes enterprise network 110 to determine what other adjacent nodes are visible to that agent 102. After identifying what adjacent nodes are visible, either agent 102, server 190, or server 192 may install another instance of agent 102 on any visible node which is a habitable node. In an embodiment, one or more agents discover and probe other nodes across Intranet 114 or any other wired or wireless network in enterprise network 110. After one or more agents are executing upon a habitable node, step 630 may be performed.

In step 630, one or more agents 102 generate analysis data that identifies the discovered habitable and opaque nodes of enterprise network 110. Each of one or more agents 102 provides the analysis data it generates to either risk modeler server 190 or local risk modeler server 192. The received analysis data is used by risk modeler server 190 and/or local risk modeler server 192 in the generation and refinement of enterprise risk model 500.

Either on their own initiative, or in response to receiving a request for additional information about the features or characteristics of nodes of enterprise network 110 from risk modeler server 190 or local risk modeler server 192, during their execution while deployed, each of one or more agents 102 may provide analysis data that describes certain information about nodes of enterprise network 110. In an embodiment, such analysis data may describe network observations, device observations, user observations, asset observations, and cloud-storage observations.

Non-limiting, illustrative examples of network observations include information about open ports (such as but not limited to a TCP or UDP port that has been opened by a device to allow other devices to connect to itself or send packet to itself, and deployed network protocols). Network observations described by analysis data in an embodiment may include the identification of any explicit port or implicit port on a habitable node or an opaque node. An explicit port is a port, opened on a node, to enable connections with other nodes over the network. An implicit port is opened by a device to allow the bi-directional flow of packets with another connected device (e.g. while browsing an external website like www.cnn.com).

Non-limiting, illustrative examples of device observations include information about files stored on the node, software (such as operation system, applications including web browsers, and BIOS) versions and installed patches, security protocols under use. Non-limiting, illustrative examples of user observations include information about user privileges and authentication protocols.

Figure 11:
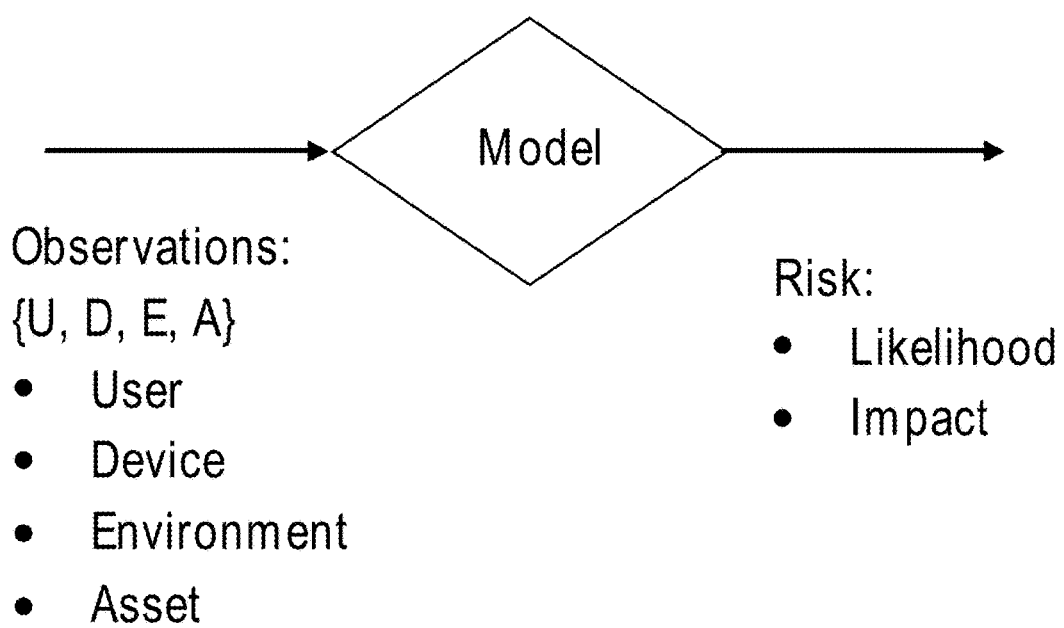
FIG. 11 is an illustration of observations used to model risk to network assets according to an embodiment of the invention.

FIG. 11 is an illustration of observations used to model risk to network assets according to an embodiment of the invention. As depicted in FIG. 11, analysis data of an embodiment may comprise data that describes for each node: attributes of the user of the node, hardware and software features of the node itself, the environment in which the node is deployed, and the assets stored on the node. Such information will be used by enterprise risk model 500 in assessing the risk of a security breach, and its impact, posed by each node.

Even though an agent 102 cannot be installed upon an opaque node, an agent 102 may observe and measure network activity going to and from an opaque node; in this manner, agent 102 can generate observation data on opaque nodes. If available, an agent may also obtain using an API exposed by an opaque node to collect information about the opaque node. After one or more nodes 102 provide exposure data and observation data to risk modeler server 190, step 640 may be performed.

In step 640, risk modeler server 190 generates enterprise risk model 500 using, at least in part, the analysis obtained in step 630. The inherent risk layer (layer 1 of enterprise risk model 500 depicted in FIG. 2) models an inherent risk presented to the enterprise network based on static features of nodes of enterprise network 110. The inherent risk layer may be generated using the exposure data received in step 630.

Figure 7:
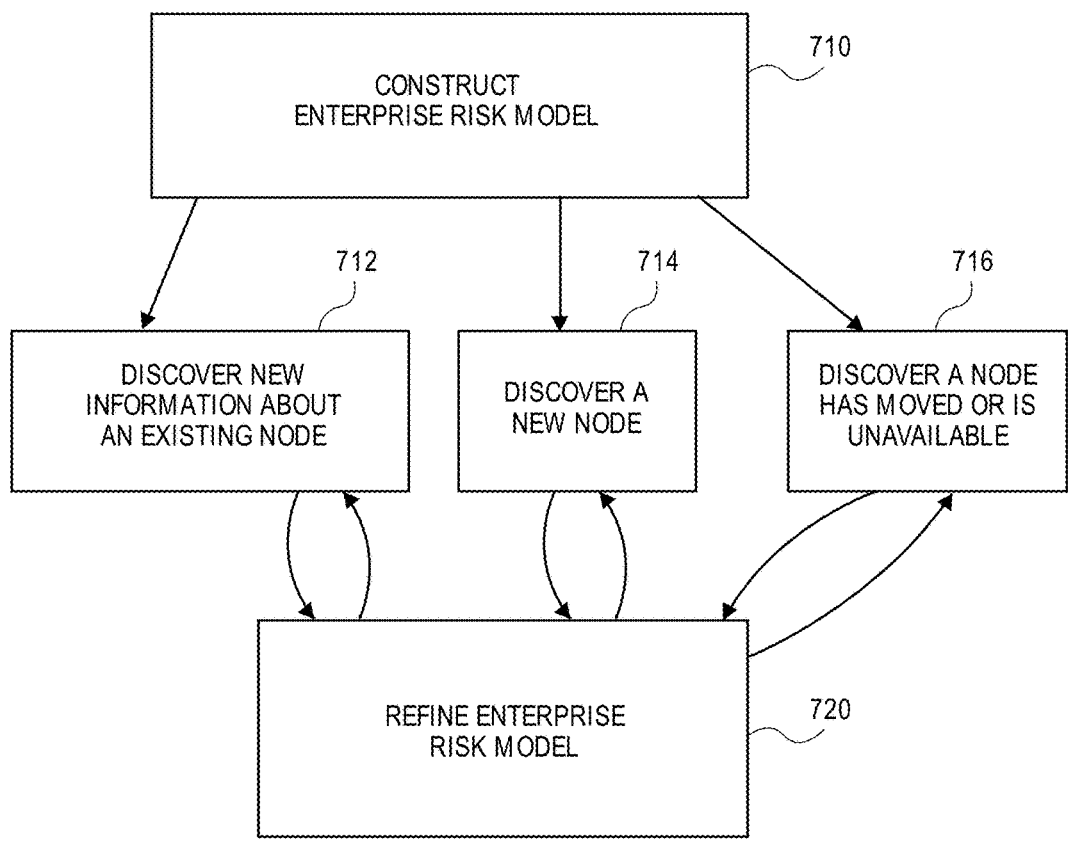
FIG. 7 is a flowchart illustrating the steps of refining the enterprise risk model over time according to an embodiment of the invention.

Analysis data will be received periodically during the deployment of one or more agents 102. Thus, enterprise risk model 500 may be improved and refined over time as information is learned about the nodes of enterprise network 110. To illustrate this principle, consider FIG. 7, which is a flowchart illustrating the steps of refining enterprise risk model 200 over time according to an embodiment of the invention.

In step 710, enterprise risk model 500 is constructed. Enterprise risk model 500 may be embodied vis-à-vis a variety of different forms. After enterprise risk model 500 is constructed, steps 712, 714, 716 may be performed in any order at any time. Thus, there is no implied sequence or order of steps 712, 714, 716.

In step 712, an agent 102 discovers new information about an existing node. For example, such information may include, without limitation, what software (including version numbers, patch installations, and authorized or unauthorized modifications and/or customizations) is installed on the node, what hardware or devices are comprises within or connected to the node, information about the configuration of software installed on the node, information about what processes are executing on the node, information about how a user is using the node, and information about the files, file structure, and digital resources stored on or accessible by the node. In response, agent 102 will generate exposure data that describes the new information about the existing node and transmit the exposure data to the entity responsible for refining enterprise risk model 500, e.g., risk modeler server 190 or local risk modeler server 192.

In step 714, an agent 102 discovers a new node on enterprise network 110. The newly discovered node may be a habitable node or an opaque node. In response, agent 102 will generate exposure data that describes the new information about the new node and transmit the exposure data to the entity responsible for refining enterprise risk model 500, e.g., risk modeler server 190 or local risk modeler server 192. If the newly discovered node is a habitable node, then agent 102 may attempt to deploy another instance of itself or otherwise install a copy of agent 102 on the newly discovered node.

In step 716, an agent 102 discovers a node has been moved or is unavailable. For example, a laptop may be physical disconnected an Ethernet port in an office, thereby leaving Intranet 114, and moved to a conference room where the laptop subsequently reconnects to Intranet 114 using a Wi-Fi connection. An agent 102 installed upon the laptop or located on Intranet 114 may detect that the laptop has moved from being physically connected using a specific Ethernet port to a Wi-Fi connection; this transition may or may not pose a change in the risk of a security breach to enterprise network 110 or the laptop itself.

In step 720, enterprise risk model 500 is refined using the information learned in step 712, 714, or 716. Enterprise risk model 500 may be updated frequently as agents 102 re-probe nodes of enterprise network 110 to glean new information. After enterprise risk model 500 is refined or updated, in an embodiment, if necessary, the one or more agents 102 executing in enterprise network 110 may be updated to reflect the latest version of enterprise risk model 500.

Using the Enterprise Risk Model

Enterprise risk model 500 may be used by embodiments in a variety of different ways to yield many positive benefits.

For example, enterprise risk model 500 may be used to programmatically generate an enumeration of all assets within enterprise network 110. The list of assets which may be identified in this fashion include all the habitable nodes and all the opaque nodes of enterprise network 110. Thus, embodiments may be used to ascertain and display in a variety of different formats information identifying all the nodes in enterprise network 110 with scientific precision.

In addition to generating a list of physical hardware, the list of assets may be configured to include information about software installed on nodes of enterprise network 110. Thus, enterprise risk model 500 may be used to identify with scientific precision all software, including information identifying the version number, installed patches, and customizations, and configuration settings, installed on nodes of enterprise network 110, as this information may be methodically collected using one or more agents 102.

Further, certain embodiments may be used to programmatically generate an enumeration of all the digital assets stored on each node of enterprise network 110. For example, if an administrator wishes to identify which nodes of enterprise network 110 store sensitive financial data, enterprise risk model 200 could be used to determine the nodes storing such content.

Further, certain embodiments may be used to programmatically identify whether any nodes of enterprise network 110 are presently compromised through observation conducted by one or more agents 102.

Embodiments of the invention may also produce what is known as a risk inventory, which is an ordered list of the inherent risks of malicious attack to the resources of the network. For example, upon request, embodiments may generate a list of top X risks ("top risks list") to enterprise network 110, where X is a configurable number. For example, if X is set to 3, the list produced might appear as:

1. Presence of secure data files on node 124
2. Unprotected WiFi network
3. Ongoing Heartbleed attacks.

The risk inventory may be filtered using a variety of different criteria. For example, the risk inventory may be generated for the enterprise or filtered based on one or more factors, such as but not limited to: a particular geographical region (such as country or state), an organizational unit (such as marketing or engineering), and a device type (such as cell phones, laptops, or PCs). Indeed, the risk inventory may be generated for a specific node or for a set a nodes associated with a specific user.

Embodiments may display information about the risk inventory to enterprise network 110 on a user interface. When a particular attack vector or risk is selected, the user interface may be updated to display additional and more granular information about the selected attack vector or risk.

In an embodiment, embodiments may display information about the risk inventory on a heat map (a risk heat map). The risk heat map may be superimposed over, or take the form of, other meaningful graphical illustrations to impart the source of risks to network enterprise 110 in an intuitive manner. For example, the risk heat map may take the form of an organizational chart, an asset diagram, a geographical map, a network diagram, or graphical illustrations of various software applications.

Figure 8A:
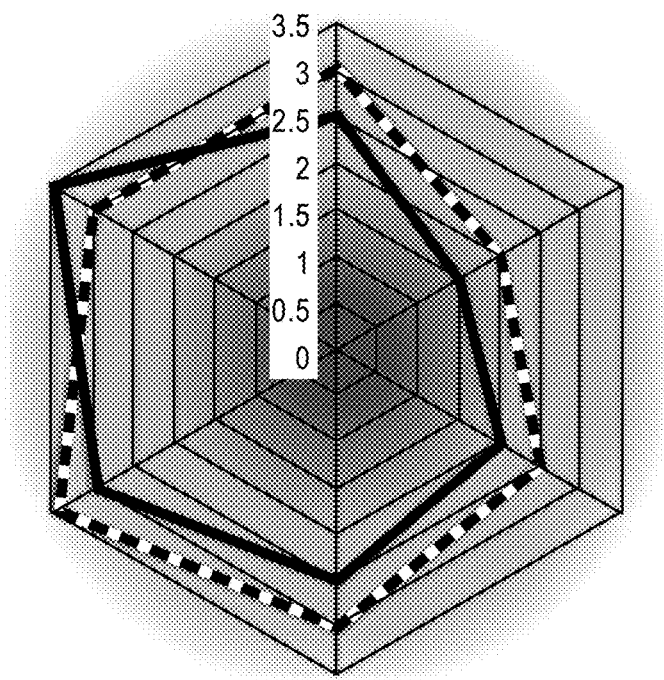
FIGS. 8A and 8B are graphical illustrations of a risk heat map according to various embodiments of the invention.
Figure 8B:
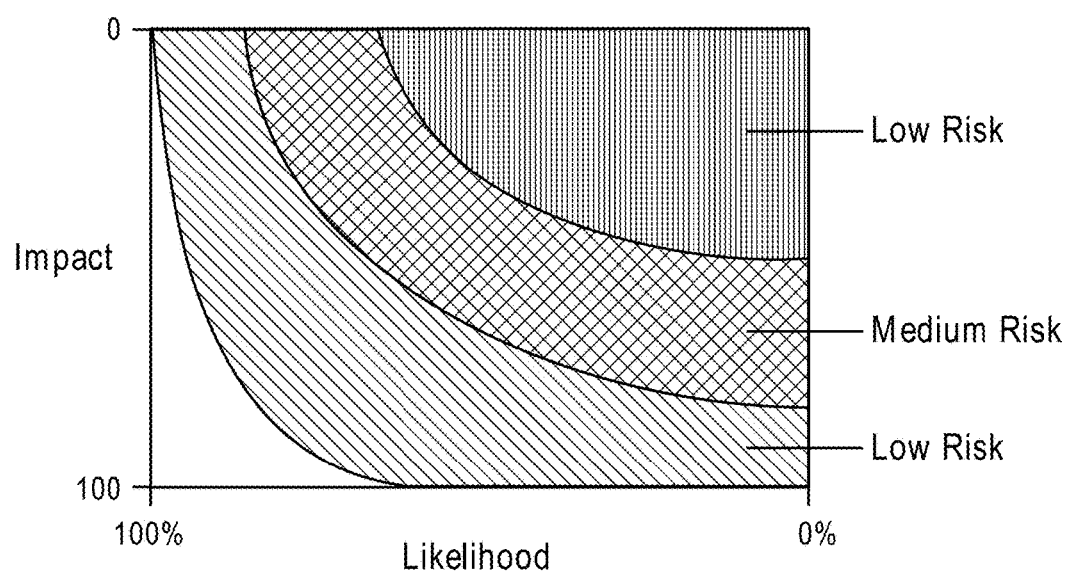

FIGS. 8A-8B are graphical illustrations of a risk heat map according to various embodiments of the invention. The example of FIG. 8A depicts the risk associated with two groups of 6 devices (one group is depicted using a solid line and the other group is depicted using a hatched line) on a scale of 0 to 3.5. The risk score of each device is plotted on the radial axis and the combined polygon shows the overall risk of the group of devices.

In the example FIG. 8B, the graph starts at the top right corner. The x-axis is the risk in one dimension (e.g. Likelihood) while the y-axis is the risk in another dimension (e.g. Impact). The curved boundaries in the graph of FIG. 8B depict the differentiation between a mix of likelihood and impact that shows low-medium-high overall risk. As depicted in FIG. 8B, low likelihood and low impact corresponds to low risk (top right) while high likelihood and high impact correspond to the high risk region (bottom left). Note that FIGS. 8A and 8B are two examples of the countless arrangements of risk heat maps which may be employed by embodiments of the invention.

In an embodiment, a risk heat map may be dynamically created to identify how an adversary is likely to breach the security of network enterprise 110 for every category of assets and/or nodes of network enterprise 110.

Identifying the Best Way to Improve Security

To illustrate a simplified example illustrating how enterprise risk model 500 may be employed by an embodiment, assume that a first computer in data center 1 depicted in FIG. 1 is a human resource server storing sensitive employee information. Given the importance of the information stored on that node, the node is assigned an impact score I of 10. Other node 130 is a desktop PC which is sparingly used and stores no important information; consequently, that node is assigned an impact score I of 1. Thus, the information stored in the human resources server is deemed to be 10 times more important than the information stored on the desktop PC 130.

The human resource server is well-guarded, not exposed to public network 180, and only has two ports open. Further, there are rules administered and enforced by a firewall as to whom may access the two open ports of the human resource server. As a result of these precautions, the human resources server is assigned a likelihood L score of 1. As risk R is calculated as the product of Impact I and likelihood L, the risk value of the human resources server is calculated as 10.

The desktop PC occasionally performs web browsing to certain web sites on a white list. Since the desktop PC performs some amount of web-browsing, a likelihood L score of 5 is assigned to this node, even though the web browsing is performed using procedures designed to mitigate risk. The value of risk R in this case is the product of Impact I (1) and likelihood L (5), which yields a value of 5.

By comparing the relative risk values of 10 for the human resources server and 5 for the desktop PC which browses the Internet, an administer or other personal responsible for ensuring the safety of enterprise network 110 can arrive at the decision that money is better spent protecting the human resources server rather than the desktop PC, even though the human resources server is already better guarded.

Logical Architecture of an Embodiment

Figure 9:
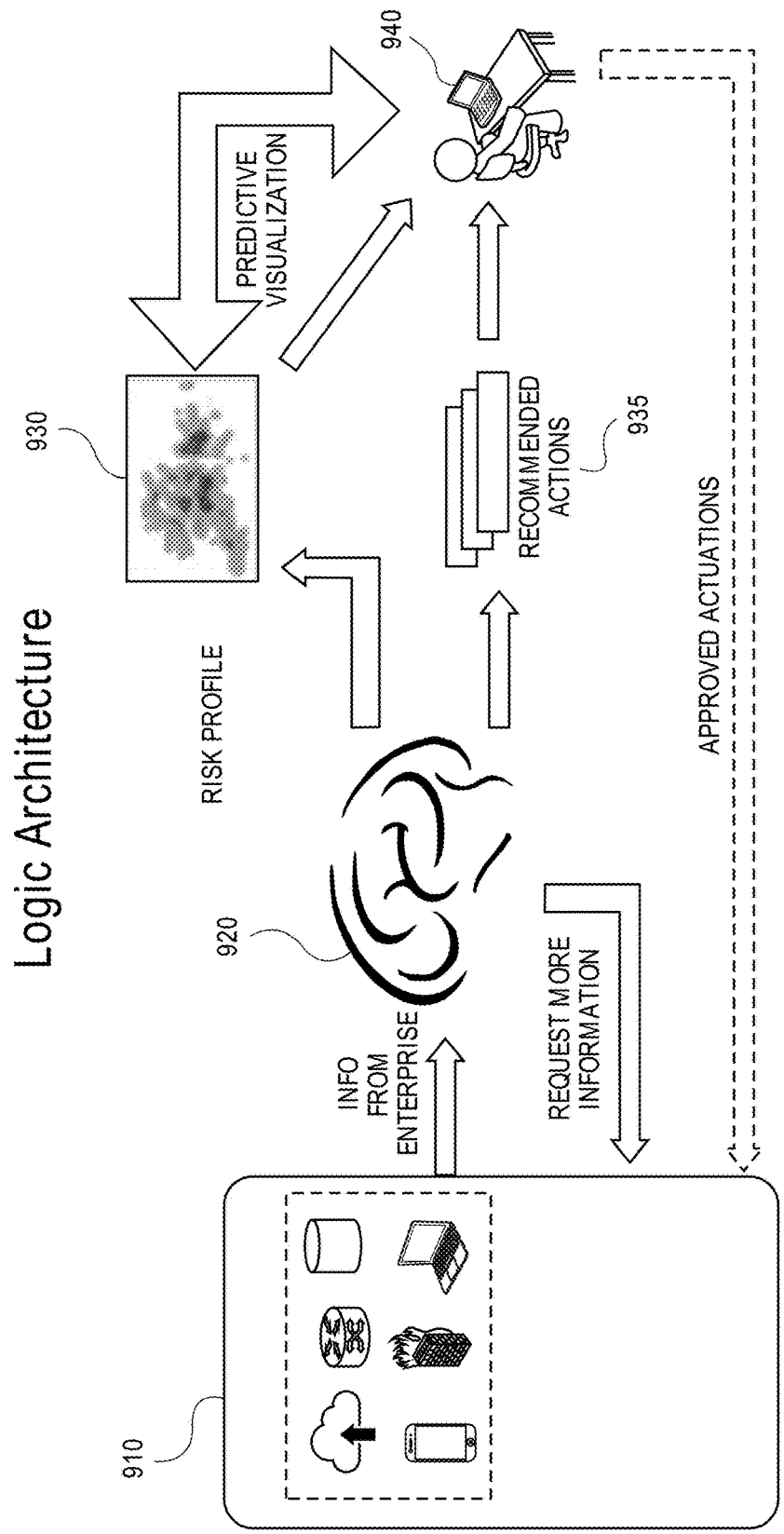
FIG. 9 is an illustration of the logical architecture for identifying and mitigating risk to the enterprise network according to an embodiment of the invention.

FIG. 9 is an illustration of the logical architecture for identifying and mitigating risk of security breach to enterprise network 110 according to an embodiment of the invention. As shown in FIG. 9, agents 910 collect analysis data from nodes of the enterprise network and transmit the analysis data to enterprise risk model 920, which may be maintained at risk modeler server 190 or local risk modeler server 192.

A user 940, such as an IT administrator or network operator, may interact with enterprise risk model 920 to obtain information about the risk of security breach to the enterprise network. Such information may be presented in a variety of formats and filtered using a variety of factors. For example, such information may be visually depicted on a risk heat map 930 or as a list of risks ordered in a particular manner. Enterprise risk model 920 may suggest recommended actions 935 to user 940, which when performed, reduce the risk of security breach to aspects of enterprise risk 110. In this way, user 940 may be informed of the recommended actions to undertake to cause the risk of a security breach to enterprise network 110 to be reduced to or below an acceptable level of risk.

When a user approves a course of action suggested by enterprise risk model 920, and applies them to the network, agents 910 will automatically detect any changes made to the enterprise network, and the risk of security breach to the enterprise network as modeled and presented by enterprise risk model 920 will be updated accordingly. As agents 910 communicate with a server upon which enterprise network model 920 resides, agents 910 may respond to specific requests for updated information from the server about the one or more nodes affected by any change made by user 940 of which enterprise network model 920 is informed. In this way, analysis data may be obtained to reflect the current state of the enterprise network to present an accurate picture to user 940.

Advantageously, enterprise network model 920 enables user 940 to be informed of the highest value assets in the enterprise network, particularly in the core. Enterprise network model 920 may use analysis data collected by agents 910 to identify, for each node in the core of the enterprise network, a path from the perimeter of the network to each node in the core of the network having the highest likelihood of a security breach, irrespective of how many hops are in the path. For each asset, a path of least resistance from the perimeter of the network to the asset may be identified. This path of least resistance corresponds to a highest likelihood of a security breach irrespective of how many hops are in the path. In this way, embodiments of the invention may be used to programmatically generate an ordered list of potential mitigative actions to reduce or mitigate impact to the risk of security breaches to the assets of the network.

Segmenting the Enterprise Network

A medieval castle most visibly offers protection vis-à-vis strong outer walls. If the outer walls of a medieval castle are breached, the castle contains internal walls which are designed to slow, impede, and stop anyone who breaches the outer walls. Computer networks are, as a general rule, not designed like a medieval castle. By analogy, once the strong outer walls of a typical computer network are breached (i.e., a malicious attack successfully gains access to a computer located on the computer network), there is very little internal security on the computer network. This is so because computer networks are generally designed for ease of use and security is an afterthought. Consequently, it is common for prior approaches to offer no protection whatsoever in zone of propagation 250 depicted in FIG. 2. In other words, once perimeter 230 is breached, there often is very little resistance or barriers between perimeter 230 and core 210, thereby making a subsequent breach of core 210 very likely once perimeter 230 has been circumvented or overcome.

Embodiments of the invention are designed to, in the parlance of the above analogy, provide inner castle walls by enhancing the security of any node-to-node activity on enterprise network 110. Embodiments of the invention programmatically determine, using enterprise risk model 500, a plurality of restrictive subnetworks in which enterprise network 110 is to be divided. Thus, each of the plurality of restrictive subnetworks is to include one or more nodes of enterprise network.

Restrictive subnetworks may, but need not in every embodiment, overlap. As a result, a single node may be a member of a single restrictive subnetwork or a member of two or more restrictive subnetworks.

The composition of a restrictive subnetwork may be based on an organizational chart, e.g., a first restrictive subnetwork may include all engineering nodes while another restrictive subnetwork includes all human resources nodes. Alternately, the composition of a restrictive subnetwork may be determined based on device type, geography, stored assets, randomly, a type of application or class of software, or a group of people. In an embodiment, risk modeler server 190 or local risk modeler server 192 can determine, with consultation with enterprise risk model 500, the composition of the plurality of restrictive subnetwork using any criteria to arranging nodes of the network into groups.

Each restrictive subnetwork requires a special credential or key to gain access. Each of one or more agents 102 is informed of the one or more restrictive subnetworks to which the agent 102 belongs. Each agent 102 therefore can enforce segmentation constraints on enterprise network 110 by requiring any process or software entity to possess the necessary credential or key associated with any restrictive subnetworks to which the agent 102 belongs when requesting access to the node or an asset stored thereon.

It is contemplated that a node may need to traverse two or more restrictive subnetworks in order to access certain assets of enterprise network 110; in an embodiment, the node desirable of that asset would not only need to possess the credential or key associated with the restrictive subnetwork to which the asset belongs, but also need the credentials to any restrictive subnetwork which needs to be traversed between the requesting node and the asset.

Note that agents 102 in each restrictive subnetwork are only informed of the credential or key for the restrictive subnetworks in which they reside. Thus, if a malicious attack were to successfully gain access to any one restrictive subnetwork of enterprise network 110 (e.g. Client Device Network 2), the compromised node with lack the credentials or keys necessary to gain access outside of its restrictive subnetwork (e.g. to Data Center 1).

In an embodiment, one or more agents 102 enforce the security constraints imposed by the plurality of restrictive subnetworks at the network level. As a result, the security constraints can be enforced against opaque nodes as well as habitable nodes. Moreover, enforcing the security constraints imposed by the plurality of restrictive subnetworks at the network level results in the security constraints being difficult to circumvent as they are implemented at a low level of operation. In an embodiment, one or more agents 102 also enforce the security constraints imposed by the plurality of restrictive subnetworks at the user level or application layer.

Embodiments may enforce the security constraints imposed by the plurality of restrictive subnetworks at the network layer (i.e., the third layer of the well-known OSI model), the application layer (i.e., the seventh layer of the well-known OSI model), and/or the credential layer (i.e., the layer or point in execution flow at which credentials are verified before granting access to assets). According to embodiments, a device can reach an asset via the routing layer, but would not be permitted to access the asset without the correct credentials.

Figure 10:
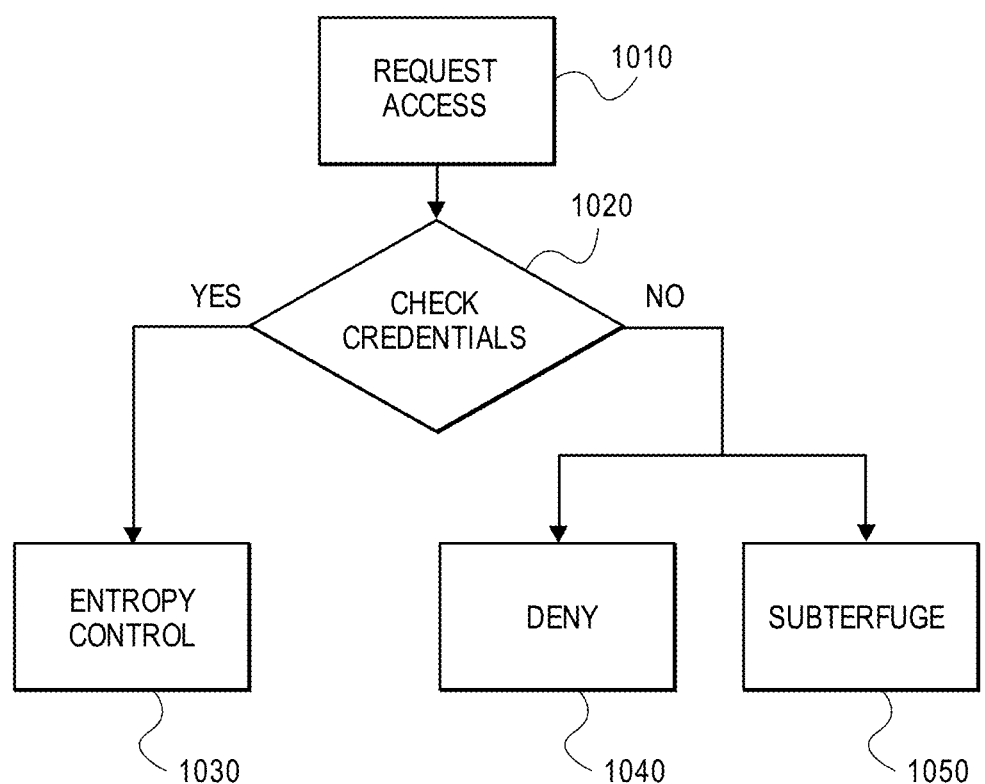
FIG. 10 is a flowchart illustrating the steps of obtaining access to an asset in a segmented environment according to an embodiment of the invention.
Figure 12:
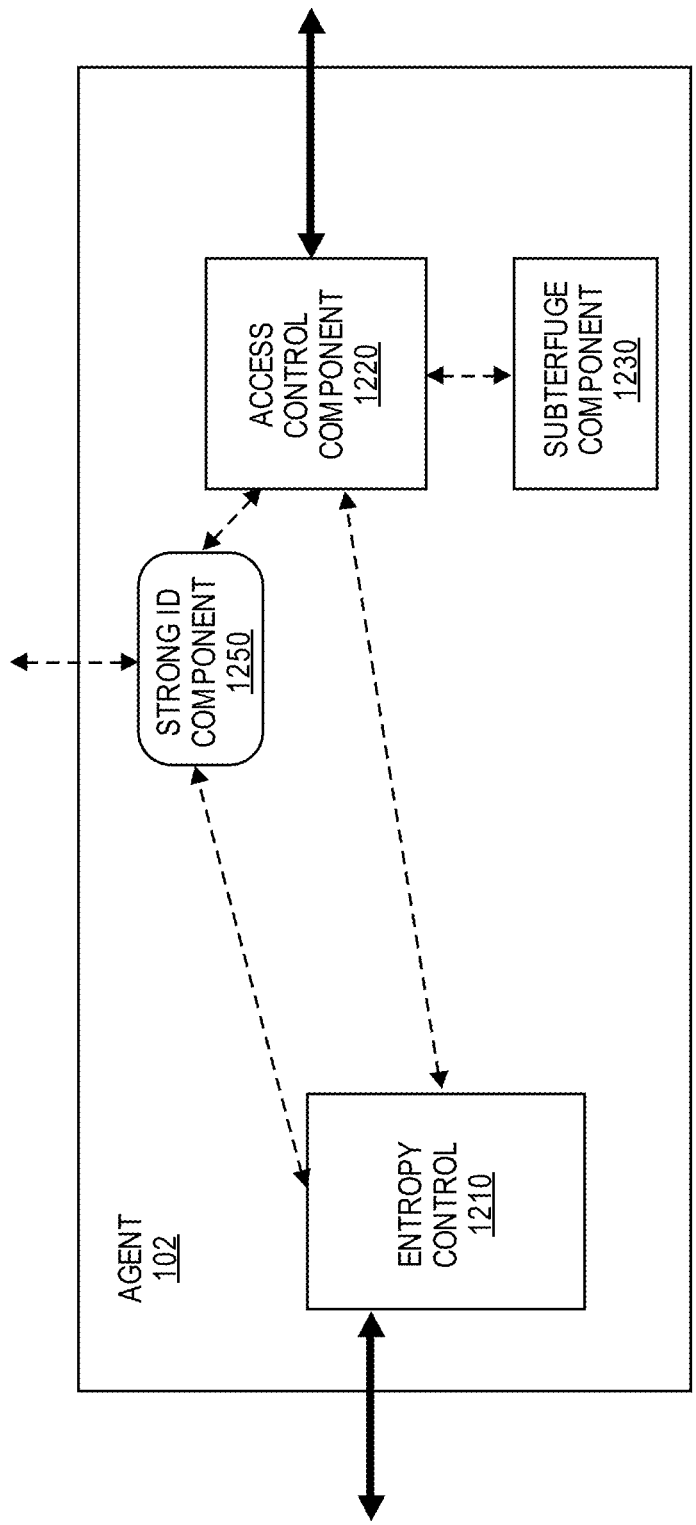
FIG. 12 is a block diagram of exemplary components of an agent according to an embodiment of the invention.

FIG. 10 is a flowchart illustrating the steps of obtaining access to an asset in a segmented environment according to an embodiment of the invention. The steps of FIG. 10 shall be described below with reference to FIG. 12, which is a block diagram of exemplary components of agent 102 according to an embodiment of the invention.

In step 1010, a requester requests access to an asset in a segmented network environment. After agent 102 receives or intercepts the request of 1010, step 1020 is performed.

Access Control and Strong Identity

In step 1020, when agent 102 receives or intercepts a request from a requestor to access an asset stored on a node of enterprise network 110, agent 102 checks the credentials associated with the requester. Access control component 1220 on agent 102 may perform step 1020, potentially with the assistance of other components such as strong ID component 1250. Strong ID component 1250 may ascertain how thoroughly the requestor's identity should be authenticated based on the risk posed by the request. In this way, a very sensitive or important asset will require a more thorough authentication process than a low priority or low value asset. In an embodiment, strong ID component 1250 may communicate with local risk modeler server 192 or risk modeler server 190 in rendering this judgement.

In an embodiment, strong ID component 1250 may require that the requestor pass two-factor authentication. A two-factor authentication is known in the art and involves confirmation of a user's claimed identity by utilizing a combination of two different techniques for doing so. The motivation of performing two-factor authentication here is to verify with additional reliable that the user purported to be taking the action is indeed that user.

In addition or in place of two-factor authentication, strong ID component 1250 may require that one or more users approving the action. Strong ID component 1250, either on its own or in collaboration with risk modeler server 190, may identify a set of one or more user who must vouch for, or otherwise approve, of the access request before the access request is permitted by agent 102. The number of users who must vouch for, or otherwise approve, of the action will increase based upon how risky the requested action is deemed by enterprise risk model 500. For example, if a secretary is allowed to access 20 documents a day and towards the end of the day she requests to access one more document than is permitted, then this may be considered to be a relatively low risk request and potentially only one other user would be required to approve of the action before agent 102 permits the secretary access to that document.

On the other hand, if a laptop is attempting to access very sensitive financial information while being physically located in a hostile country, then agent 102 may determine, either on its own or in collaboration with risk modeler server 190, that five additional users must vouch for, or otherwise approve, of the requested action before agent 102 will permit access to the sensitive financial information. Enterprise risk model 500 may be used to determine, based on the severity of the perceived risk, how many individuals are required to vouch for, or otherwise approve, of the action before agent 102 permits the performance thereof.

The particular identities of the users required to vouch or approve of a requested action should be somewhat random so as to make it difficult to determine the identities of those individuals ahead of time. Thus, the particulars identities of the users required to vouch or approve of a requested action may be chosen, with consultation with enterprise risk model 500, contemporaneously with receipt of the requested action according to an embodiment.

If, in step 1020, the agent 102 determines that the credentials associated with the requester are sufficient to grant access, then step 1030 is performed.

Entropy Control

In step 1030, agent 102 grants access the requestor access to the asset, subject to entropy constraints enforced by entropy control 1210 in agent 102. Certain embodiments of the invention may operate such that one or more agents 102 enforce security constraints known as entropy constraints. An entropy constraint is a restriction on the use of a particular asset.

Non-limiting, illustrative examples of entropy constraints which may be enforced by entropy control 1210 of agent 102 include: limiting an amount of time an asset may be accessed, limiting the amount of an asset which may be accessed, limiting a set of actions (such as but not limited to reading, writing, or deleting) which may be performed against or using said asset, and liming how many times a particular action (such as but not limited to reading and writing) may be performed against an asset.

For example, an entropy constraint may be defined to limit a particular user from reading, writing, or deleting more than X number of documents per day. Another entropy constraint may be defined to limit a particular user from reading more than X number of pages of documents per hour. Another entropy constraint may be defined to limit a particular user from printing or downloading more than X number of documents per day. Another entropy constraint may be defined to limit any user from reviewing or printing a particular document more than once a week. In an embodiment, if a particular agent 102 determines that an entropy constraint is about to be violated, then that agent 102 prevents the action from occurring and potential other actions, such as raising an alert or notifying an administrator.

Subterfuge

If, in step 1020, the agent 102 determines that the credentials associated with the requester are insufficient to grant access, then one of two steps may be performed.

In an embodiment, if the agent 102 determines that the credentials associated with the requester are insufficient to grant access, then step 1040 may be performed in which agent 102 denies the requestor access to the desired asset.

However, if a malicious party is detected attempting to breach, or otherwise gain illegal access to, enterprise network 110, then, in an embodiment, it may be desirable to perform step 1050 by providing the attacker with the sense that they are successful by supplying the attacker with access to a decoy system comprised of counterfeit assets rather than simply denying the attacker access. The motivation for doing so is that if the attacker believes that they have been successful, then they will be dissuaded from trying to break into and steal the real assets of enterprise network 110, because they believe they are already in possession of them. Such an approach is particularly desirable to protect assets of great importance, as attackers will put forth a great deal and time and effort to obtain them.

Embodiments of the invention may enable the administer of enterprise network 110 to define a set of network assets which will be simulated using a decoy system that dynamically generates counterfeit assets to be presented to any entity identified as attempting to access those assets without sufficient credentials to do so. Subterfuge component 1230, comprised within agent 102, may be responsible for carrying out agent's responsibilities in step 1050. For example, subterfuge component 1230 may cause or request the dynamic replication of one or more counterfeit assets having similar features to the original, requested assets but dissimilar content to preserve the privacy of the original asset. Thereafter, subterfuge component 1230 may grant or provide the requestor with access to the counterfeit assets without granting or providing access to the original assets.

Hardware Mechanisms

Figure 13:
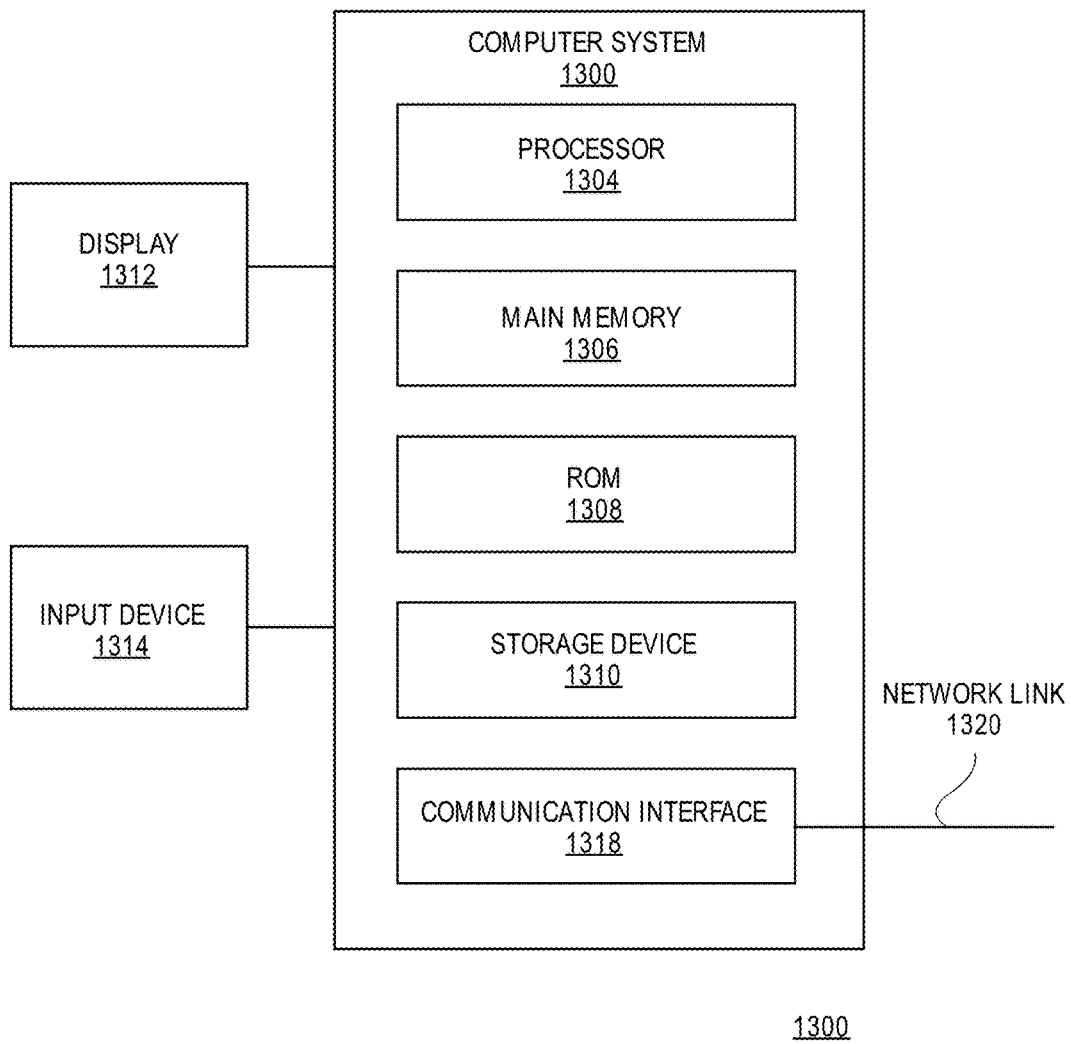
FIG. 13 is a block diagram that illustrates a computer system upon which an embodiment of the invention may be implemented.

In an embodiment, all nodes of enterprise network and risk modeler server 190 depicted in FIG. 1 may be implemented by one or more computer systems. FIG. 13 is a block diagram that illustrates a computer system 1300 upon which an embodiment of the invention may be implemented. In an embodiment, computer system 1300 includes processor 1304, main memory 1306, ROM 1308, storage device 1310, and communication interface 1318. Computer system 1300 includes at least one processor 1304 for processing information. Computer system 1300 also includes a main memory 1306, such as a random access memory (RAM) or other dynamic storage device, for storing information and instructions to be executed by processor 1304. Main memory 1306 also may be used for storing temporary variables or other intermediate information during execution of instructions to be executed by processor 1304. Computer system 1300 further includes a read only memory (ROM) 1308 or other static storage device for storing static information and instructions for processor 1304. A storage device 1310, such as a magnetic disk or optical disk, is provided for storing information and instructions.

Computer system 1300 may be coupled to a display 1312, such as a cathode ray tube (CRT), a LCD monitor, and a television set, for displaying information to a user. An input device 1314, including alphanumeric and other keys, is coupled to computer system 1300 for communicating information and command selections to processor 1304. Other non-limiting, illustrative examples of input device 1314 include a mouse, a trackball, or cursor direction keys for communicating direction information and command selections to processor 1304 and for controlling cursor movement on display 1312. While only one input device 1314 is depicted in FIG. 13, embodiments of the invention may include any number of input devices 1314 coupled to computer system 1300.

Embodiments of the invention are related to the use of computer system 1300 for implementing the techniques described herein. According to one embodiment of the invention, those techniques are performed by computer system 1300 in response to processor 1304 executing one or more sequences of one or more instructions contained in main memory 1306. Such instructions may be read into main memory 1306 from another machine-readable medium, such as storage device 1310. Execution of the sequences of instructions contained in main memory 1306 causes processor 1304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in persistently storing instructions which may be provided to processor 1304 for execution. Such a medium may take many forms, including optical or magnetic disks, such as storage device 1310.

Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 1304 for execution. For example, the instructions may initially be carried on a magnetic disk of a remote computer. The remote computer can load the instructions into its dynamic memory and send the instructions over a network link 1320 to computer system 1300.

Communication interface 1318 provides a two-way data communication coupling to a network link 1320 that is connected to a local network. For example, communication interface 1318 may be an integrated services digital network (ISDN) card or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through a local network to a host computer or to data equipment operated by an Internet Service Provider (ISP).

Computer system 1300 can send messages and receive data, including program code, through the network(s), network link 1320 and communication interface 1318. For example, a server might transmit a requested code for an application program through the Internet, a local ISP, a local network, subsequently to communication interface 1318. The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium that stores one or more sequences of instructions for analyzing risk of security breaches to a network, which when executed by one or more processors, cause:

one or more agents gathering, from multiple sources across the network, analysis data that identifies one or more habitable nodes and one or more opaque nodes of the network, wherein the one or more habitable nodes each possess a computing environment conducive to installation of at least one of said one or more agents, and wherein the one or more opaque nodes each possess a computing environment not conducive to installation of the one or more agents, wherein said analysis data identifies, for each of the one or more habitable nodes and for each of the one or more opaque nodes, whether each node is located on a perimeter of the network or on a core of the network, wherein the perimeter of the network corresponds to a first set of nodes of the network which can directly communicate with a public network, and wherein the core of the network corresponds to a second set of nodes of the network which do not directly communicate with a public network;

generating, using the analysis data, an enterprise risk model for the network that models a risk of security breaches to assets of the network from both authorized and unauthorized users of the network based on attributes of the one or more habitable nodes and the one or more opaque nodes;

determining, using said analysis data and said enterprise risk model, for each node in the core of the network, a path from the perimeter of the network to said each node in the core of the network having the highest likelihood of a security breach, wherein said path is irrespective of how many hops are in said path; and notifying a user or software process of said path for at least one node in the core of the network.

2. The non-transitory computer-readable storage medium of claim 1, wherein the one or more agents execute on the one or more habitable nodes.

3. The non-transitory computer-readable storage medium of claim 1, wherein at least a portion of the one or more agents execute on one or more devices that are physically connected to the one or more opaque nodes of the network.

4. The non-transitory computer-readable storage medium of claim 1, wherein at least a portion of the one or more agents are located at vantage points on said network enabling observation of all network traffic delivered to or sent from all of the one or more opaque nodes.

5. The non-transitory computer-readable storage medium of claim 1, wherein the one or more agents identify explicit ports on all of the one or more habitable nodes and all of the one or more opaque nodes of the network, wherein an explicit port is a port, opened on a node, to enable connections with other nodes over the network.

6. The non-transitory computer-readable storage medium of claim 1, wherein the one or more agents identify any open implicit ports on all of the one or more habitable nodes and all of the one or more opaque nodes of the network, wherein an implicit port is a domain associated with digital content received by a node on the network.

7. The non-transitory computer-readable storage medium of claim 1, wherein said analysis data comprises credential information describing how credentials are used on a particular node on the network, and wherein the credential information identifies any weak passwords employed by the particular node, any shared credentials used by the particular node and another entity other than said particular node, and whether the particular node does not require a credential to access certain assets or services.

8. The non-transitory computer-readable storage medium of claim 1, wherein said analysis data comprises four or more of: network observations, device observations, user observations, asset observations, and cloud-storage observations.

9. The non-transitory computer-readable storage medium of claim 1, wherein execution of the one or more sequences of instructions further cause:

installing the one or more agents onto one or more nodes of the network; and after installing the one or more agents, the one or more agents dispersing over the network by installing copies of themselves on one or more other habitable nodes of the network.

10. The non-transitory computer-readable storage medium of claim 1, wherein said enterprise risk model identifies, for each node in the core of the network, a set of valuable assets stored in the core, and wherein execution of the one or more sequences of instructions further cause:

for each asset in the set of valuable assets, identifying a path of least resistance from the perimeter of the network to said each valuable asset, wherein said path of least resistance is determined, by said enterprise risk model, to correspond to a highest likelihood of a security breach irrespective of how many hops are in said path.

11. The non-transitory computer-readable storage medium of claim 1, wherein said analysis data identifies, for each of the one or more habitable nodes and for each of the one or more opaque nodes, a relative vulnerability of the node to legal access, illegal access, and bypass access, wherein said legal access corresponds to a security breach perpetrated by a trusted user or trusted entity, wherein said illegal access corresponds to a security breach perpetrated vis-à-vis the malicious acquisition of credentials, and wherein said bypass access corresponds to a security breach perpetrated by a software vulnerability used to bypass the access control system.

12. The non-transitory computer-readable storage medium of claim 1, wherein execution of the one or more sequences of instructions further cause:

programmatically generating, using said analysis data, an enumeration of said all habitable nodes and all opaque nodes of the network.

13. A non-transitory computer-readable storage medium that stores one or more sequences of instructions for analyzing risk of security breaches to a network, which when executed by one or more processors, cause:

one or more agents gathering, from multiple sources across the network, analysis data that identifies one or more habitable nodes and one or more opaque nodes of the network, wherein the one or more habitable nodes each possess a computing environment conducive to installation of at least one of said one or more agents, and wherein the one or more opaque nodes each possess a computing environment not conducive to installation of the one or more agents;

generating, using the analysis data, an enterprise risk model for the network that models a risk of security breaches to assets of the network from both authorized and unauthorized users of the network based on attributes of the one or more habitable nodes and the one or more opaque nodes, wherein the analysis data identifies software, and characteristics thereof, installed upon all habitable nodes and all opaque nodes of the network; and programmatically generating an enumeration of software, including version and patch installations, installed on at least a subset of said all habitable nodes and all opaque nodes of the network.

14. The non-transitory computer-readable storage medium of claim 1, wherein the analysis data identifies a set of digital assets, and paths of their storage locations, on at least a subset of all habitable nodes and all opaque nodes of the network, and wherein execution of the one or more sequences of instructions further cause:
   programmatically generating an enumeration of the set of digital assets, and paths of their storage locations, on said subset.

15. The non-transitory computer-readable storage medium of claim 1, wherein the one or more agents communicate with a server upon which said enterprise risk model resides, and wherein the one or more agents respond to requests for information about the one or more habitable nodes and one or more opaque nodes received from said server.

16. The non-transitory computer-readable storage medium of claim 1, wherein the one or more agents communicate with a server upon which said enterprise risk resides, and wherein said server refines said enterprise risk model over time based upon the analysis data received from said one or more agents.

17. A non-transitory computer-readable storage medium that stores one or more sequences of instructions for analyzing risk of security breaches to a network, which when executed by one or more processors, cause:
   one or more agents gathering, from multiple sources across the network, analysis data that identifies one or more habitable nodes and one or more opaque nodes of the network, wherein the one or more habitable nodes each possess a computing environment conducive to installation of at least one of said one or more agents, and wherein the one or more opaque nodes each possess a computing environment not conducive to installation of the one or more agent;
   generating, using the analysis data, an enterprise risk model for the network that models a risk of security breaches to assets of the network from both authorized and unauthorized users of the network based on attributes of the one or more habitable nodes and the one or more opaque nodes; and
   programmatically generating, using the network risk model of the network, an ordered list of risks of security breaches to the assets of the network.

18. The non-transitory computer-readable storage medium of claim 17, wherein programmatically generating the ordered list of risks of security breaches comprises:
   upon receiving a set of criteria, generating the ordered list of risks of security breaches based on the set of criteria, wherein said set of criteria include one or more of: a particular geographical region, an organizational unit, a device type, a specific node, and one or more specific users.

19. The non-transitory computer-readable storage medium of claim 1, wherein execution of the one or more sequences of instructions further cause:
   programmatically generating an ordered list of potential mitigative actions generated dynamically in an arrangement to reduce or mitigate impact to the risk of security breaches to the assets of the network.

20. The non-transitory computer-readable storage medium of claim 1, wherein execution of the one or more sequences of instructions further cause:
   programmatically generating, using the network risk model of the network, a heat map depicting a set of risks of security breaches to the assets of the network.

21. An apparatus for analyzing risk of security breaches to a network, comprising:
   one or more processors; and
   one or more non-transitory computer-readable storage mediums storing one or more sequences of instructions, which when executed, cause:
   receiving, from one or more agents gathering from multiple sources across the network, analysis data that identifies one or more habitable nodes and one or more opaque nodes of the network, wherein the one or more habitable nodes each possess a computing environment conducive to installation of at least one of said one or more agents, and wherein the one or more opaque nodes each possess a computing environment not conducive to installation of the one or more agents,
   wherein said analysis data identifies, for each of the one or more habitable nodes and for each of the one or more opaque nodes, whether each node is located on a perimeter of the network or on a core of the network,
   wherein the perimeter of the network corresponds to a first set of nodes of the network which can directly communicate with a public network, and
   wherein the core of the network corresponds to a second set of nodes of the network which do not directly communicate with a public network;
   generating, using the analysis data, an enterprise risk model for the network that models a risk of security breaches to assets of the network from both authorized and unauthorized users of the network based on attributes of the one or more habitable nodes and the one or more opaque nodes;
   determining, using said analysis data and said enterprise risk model, for each node in the core of the network, a path from the perimeter of the network to said each node in the core of the network having the highest likelihood of a security breach, wherein said path is irrespective of how many hops are in said path; and
   notifying a user or software process of said path for at least one node in the core of the network.

22. A method for analyzing risk of security breaches to a network, comprising:
   one or more agents gathering, from multiple sources across the network, analysis data that identifies one or more habitable nodes and one or more opaque nodes of the network, wherein the one or more habitable nodes each possess a computing environment conducive to installation of at least one of said one or more agents, and wherein the one or more opaque nodes each possess a computing environment not conducive to installation of the one or more agents,
   wherein said analysis data identifies, for each of the one or more habitable nodes and for each of the one or more opaque nodes, whether each node is located on a perimeter of the network or on a core of the network,
   wherein the perimeter of the network corresponds to a first set of nodes of the network which can directly communicate with a public network, and
   wherein the core of the network corresponds to a second set of nodes of the network which do not directly communicate with a public network; and
   generating, using the analysis data, an enterprise risk model for the network that models a risk of security breaches to assets of the network from both authorized and unauthorized users of the network based on attributes of the one or more habitable nodes and the one or more opaque nodes;

determining, using said analysis data and said enterprise risk model, for each node in the core of the network, a path from the perimeter of the network to said each node in the core of the network having the highest likelihood of a security breach, wherein said path is irrespective of how many hops are in said path; and notifying a user or software process of said path for at least one node in the core of the network.

23. The non-transitory computer-readable storage medium of claim 1, wherein said path is formed using two or more attack vectors.

* * * * *